US010703246B2

(12) United States Patent
Vanel

(10) Patent No.: US 10,703,246 B2
(45) Date of Patent: Jul. 7, 2020

(54) VEHICLE COMPRISING A DEFORMABLE FEET SUPPORT DEVICE

(71) Applicant: FAURECIA INTERIEUR INDUSTRIE, Nanterre (FR)

(72) Inventor: Eric Vanel, Novilliers (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 59 days.

(21) Appl. No.: 15/962,713

(22) Filed: Apr. 25, 2018

(65) Prior Publication Data

US 2018/0312093 A1 Nov. 1, 2018

(30) Foreign Application Priority Data

Apr. 25, 2017 (FR) ...................... 17 53550

(51) Int. Cl.
| | |
|---|---|
| *B60N 3/06* | (2006.01) |
| *B60N 2/02* | (2006.01) |
| *B60N 3/04* | (2006.01) |
| *B60N 2/06* | (2006.01) |
| *B60N 2/16* | (2006.01) |
| *B60N 2/20* | (2006.01) |

(52) U.S. Cl.
CPC ............. *B60N 3/063* (2013.01); *B60N 2/02* (2013.01); *B60N 2/0224* (2013.01); *B60N 2/0252* (2013.01); *B60N 2/06* (2013.01); *B60N 3/04* (2013.01); *B60N 2/16* (2013.01); *B60N 2/20* (2013.01)

(58) Field of Classification Search
CPC ........ B60N 3/063; B60N 3/04; B60N 2/0252; B60N 2/02; B60N 2/06; B60N 2/0224; B60N 2/16; B60N 2/20
See application file for complete search history.

(56) References Cited

U.S. PATENT DOCUMENTS 6,474,728 B1 * 11/2002 Mendis .................. B60K 23/00
296/190.08

FOREIGN PATENT DOCUMENTS

| EP | 1533190 A1 | 5/2005 |
|---|---|---|
| EP | 1820687 A1 | 8/2007 |
| EP | 1974992 A1 | 10/2008 |
| WO | WO03044614 A1 | 5/2003 |

OTHER PUBLICATIONS

French Search Report for application No. FR 1753550, dated Jan. 11, 2018, 2 pages.

* cited by examiner

*Primary Examiner* — D Glenn Dayoan
*Assistant Examiner* — Melissa Ann Bonifazi
(74) *Attorney, Agent, or Firm* — Reising Ethington P.C.

(57) ABSTRACT

A vehicle having a vehicle body that includes a floor, partially defining the inside of the passenger compartment of the vehicle, a movable seat extending over the floor in the passenger compartment of the vehicle, and a foot support device for the occupant of the seat extending over the floor near the seat and defining a surface for receiving the feet. The support device is deformable relative to the body of the vehicle so as to modify at least the orientation of the receiving surface. The deformation of the support device is coupled with the movement of the seat such that the movement of the seat causes a coordinated deformation of the support device.

11 Claims, 1 Drawing Sheet

VEHICLE COMPRISING A DEFORMABLE FEET SUPPORT DEVICE

TECHNICAL FIELD

The present invention relates to a vehicle, of the type comprising:
- a vehicle body comprising a floor, partially defining the inside of the passenger compartment of the vehicle,
- a seat extending over the floor in the passenger compartment of the vehicle, said seat being movable relative to the body of the vehicle, and
- a foot support device for the occupant of the seat extending over the floor near the seat and defining a surface for receiving the feet, said support device being deformable relative to the body of the vehicle so as to modify at least the orientation of the receiving surface.

The invention for example applies to a motor vehicle.

BACKGROUND

The use of a foot support, or foot rest, in a vehicle makes it possible to form a surface for receiving the feet extending in an inclined manner relative to the floor to allow the driver or a passenger to rest his feet on the receiving surface ergonomically and comfortably.

In order to improve these ergonomics, the foot support can for example be placed in different positions by the occupant of the seat. However, these different positions are discrete positions remote from one another not allowing a fine adjustment of the position or the orientation of the receiving surface. This problem is even greater given that the vehicle seats are capable of adopting an increasing number of different configurations while allowing an increasingly fine adjustment of the orientation of the seat bottom and the seat back of the seat as well as the position of the seat in the passenger compartment in the front-back direction of the vehicle. Consequently, the foot support is not suitable for all of the configurations that the seat may occupy, and the occupant of the seat may thus find himself in positions in which the position of the foot support does not provide optimal comfort for the passenger.

SUMMARY

One aim of the invention is to offset these drawbacks by proposing a vehicle in which the foot support is adapted to that of the seat in all positions that the seat may occupy.

To that end, the invention relates to a vehicle of the aforementioned type, wherein the deformation of the support device is coupled with the movement of the seat such that the movement of the seat causes a coordinated deformation of the support device.

By providing a deformation of the foot support coordinated with the movement of the seat, the orientation of the receiving surface for the feet is always adapted to the position of the seat, in all positions that the latter may occupy. Coordinated means that the movement of the seat is synchronized with the deformation of the foot support. Thus, optimal comfort is offered to the occupant of the seat, irrespective of the configuration in which he places the seat.

According to other features of the vehicle according to the invention, considered alone or according to any technically possible combination:
- the deformation of the support device is coupled with the movement of the seat such that the movement of the seat causes a continuous deformation of the support device;
- the seat comprises a seat bottom and a seat back, the orientation of the seat bottom and/or the seat back being able to be modified during the movement of the seat, the support device being deformable so as to adapt the orientation of the receiving surface to the orientation of the seat bottom and/or the seat back;
- the receiving surface remains substantially parallel to the seat bottom during the movement of the seat;
- the seat can be translated in a longitudinal direction of the passenger compartment of the vehicle, the support device being deformable so as to adapt the position of the receiving surface to the position of the seat in the longitudinal direction;
- the receiving surface is inclined relative to the floor, the deformation of the support device being arranged to modify the incline angle of the receiving surface relative to the floor;
- the support device comprises at least one deformable element and a trim layer covering said deformable element, the receiving surface being formed by at least part of the outer surface of said trim layer;
- the support device is deformable between an upright position and a lying position, the outer surface of the trim layer extending in at least two planes and the receiving surface extending in one of said planes in the upright position and the outer surface of the trim layer extending substantially in a single plane in the lying position.
- the distance between the floor and the receiving surface in the upright position is smaller than the distance between the floor and the receiving surface in the lying position;
- the deformable element is an inflatable element; and
- the movement of the seat and the deformation of the foot support device are commanded by a control device controlled by a user such that a modification of the movement of the seat causes a deformation of the support device.

BRIEF DESCRIPTION OF THE DRAWINGS

Other aspects and advantages of the invention will appear upon reading the following description, provided as an example, and done in reference to the appended drawings, in which.

DETAILED DESCRIPTION OF THE ILLUSTRATED EMBODIMENT

Figure 1:
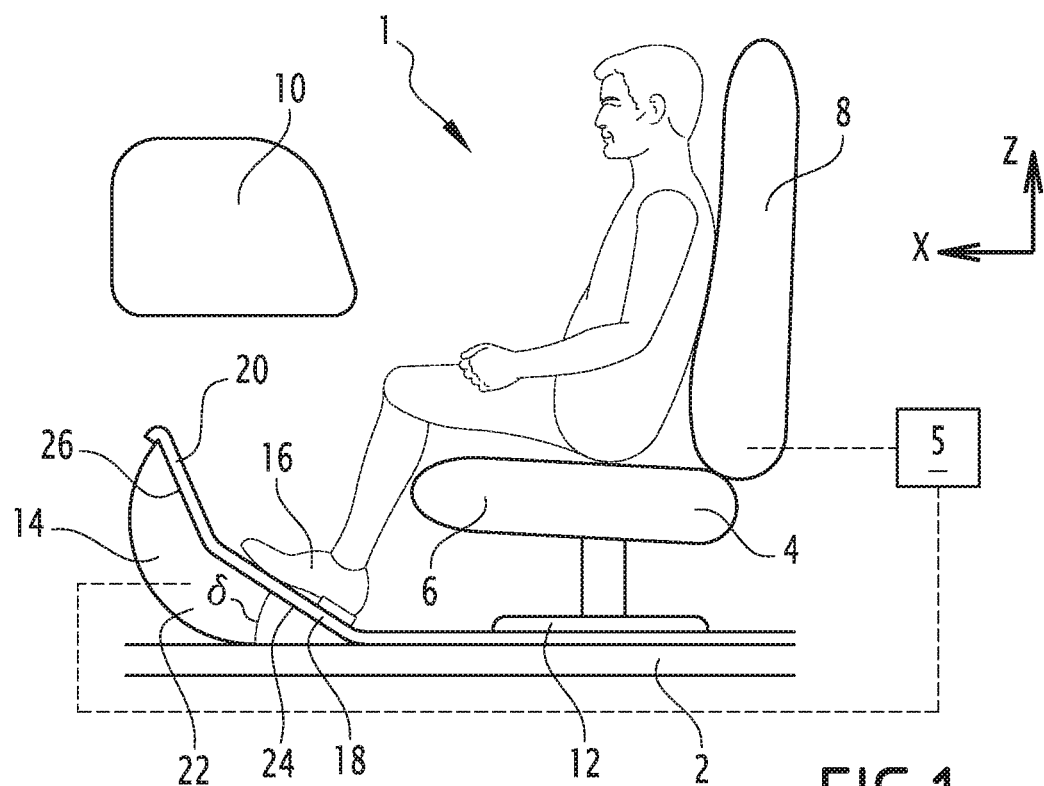
FIG. 1 is a schematic side illustration of part of a vehicle according to the invention, in which the seat is placed in a driving position.

In reference to the figures, a vehicle is described comprising a vehicle body defining a passenger compartment 1 arranged to receive one or several passengers of the vehicle. The vehicle shown in the figures is a motor vehicle and the passenger is the front passenger of the vehicle. It is, however, understood that the invention applies to any type of vehicle and any type of seats in the vehicle.

The passenger compartment is partly defined by a floor 2 extending substantially and at least partly in a plane defined by a longitudinal direction X, corresponding to the front-back direction of the vehicle, and a transverse direction, corresponding to the width of the vehicle. The passenger compartment 1 extends above the floor 2 in an elevation direction Z, corresponding to the height of the vehicle.

The vehicle comprises at least one seat 4 mounted on the floor 2. The seat 4 traditionally comprises a seat bottom 6, on which a passenger is intended to be seated, and a seat back 8, against which the passenger's back can rest. The position of the seat 4 is adjustable so as to modify its position in the passenger compartment, for example to move it farther away from or closer to the dashboard 10 of the vehicle, in the case of the seat of the front passenger of a motor vehicle. To that end and as is known in itself, the seat bottom 6 of the seat 2 is for example mounted movable in translation on rails 12 secured to the floor of the vehicle and extending in the longitudinal direction X. Thus, the entire seat can be moved in the longitudinal direction by adjusting the position of the seat bottom 6 relative to the rails 12. Also traditionally, the incline of the seat bottom 6 and/or the seatback 8 is adjustable. Thus, the angle $\alpha$ between the seat bottom 6 and the longitudinal direction X and/or the angle $\beta$ between the seat back 8 and the elevation direction Z of the vehicle (FIG. 2) are adjustable so as to vary the incline of the seat as desired by the passenger. According to one embodiment, the incline of the seat bottom 6 and the seatback 8 can be adjusted independently of each other according to one operating mode and in a synchronized manner according to another operating mode. Thus, the user can adjust the incline of the seat bottom 6, the seatback 8, respectively, without altering that of the seatback 8, that of the seat bottom 6, respectively, according to one operating mode. According to another operating mode, the change of the incline of the seat bottom 6, the seatback 8, respectively, causes a corresponding change in the seatback 8, the seat bottom 6, respectively.

Thus, the seat 4 can be placed in a plurality of adjustment positions allowing the user to adapt the seat to his morphology and/or in order to place it in a particular position, such as an upright position (FIG. 1) or a lying position (FIG. 2) or an idle position, for example.

The position of the seat 4 is for example adjusted using an electric control device 5 controllable by the user of the seat 4.

In front of the seat 4, in the direction that the passenger faces when he is occupying the seat, the vehicle comprises a foot support device 14 arranged to receive the feet 16 of the user when he is installed in the seat 4. To that end, the support device 14 is arranged to form a receiving surface 18 for the feet extending in the passenger compartment of the vehicle, near the floor 2 and in front of the seat. The receiving surface 18 is for example formed by the outer surface of a trim layer 20. The trim layer 20 is for example formed by a layer covering the floor 2, for example a carpet or mat or the like.

The support device 14 is deformable so as to make it possible to modify at least the orientation of the receiving surface 18 based on the position of the seat 4, as will be described later. Furthermore, the support device 14 can be deformable to modify the position of the receiving surface 18 based on the position of the seat 4, as will be described later. To that end, the support device 14 comprises a deformable element 22 arranged below the trim layer 20, i.e., between the floor 2 and the trim layer 20, the deformable element being deformable relative to the floor 2. The deformation of the deformable element 22 causes the receiving surface 18 to move so as to move it and/or modify its orientation. The deformable element 22 is for example formed by one or several inflatable elements deformable between a deflated position, in which the volume of the inflatable element is reduced, and several inflated positions, in which the volume of the inflatable element is increased. In other words, the more the inflatable element is inflated, the larger its volume is. The inflation of the inflatable element(s) thus causes the trim layer 20 to move, for example raising part of the trim layer 20 in the elevation direction Z, i.e., the distance between part of the trim layer 20 and the floor 2 in line with the inflatable element increases as the inflatable element is increased. The inflation can also cause part of the trim layer 20 to move in the longitudinal direction X so as to bring it closer to the seat 4. By combining the movement in the elevation direction Z and the movement in the longitudinal direction X, the position and the orientation of the receiving surface 18 can be modified. Modifying the position refers to a movement of the receiving surface in the elevation direction Z and/or the longitudinal direction, and modifying the orientation refers to a modification of the angle formed between the receiving surface 18 and the plane in which the floor 2 extends. Indeed, the receiving surface 18 is for example inclined more or less relative to the floor 2. The inflation can also make it possible to increase the size of the receiving surface 18, as will be described later.

Thus, the deformable element 22 can be placed in a multitude of positions, ranging from the deflated position to the completely inflated position of all of the inflatable elements, allowing a fine adjustment of the position and the orientation of the receiving surface 18. Furthermore, the positions and orientations are adjacent to one another, and it is possible to go from one to another continuously, i.e., the positions are not discrete positions spaced apart from one another.

Alternatively, the deformable element 22 could be formed by any appropriate element to move and orient the receiving surface 18 in a plurality of adjacent and continuous positions. Thus as an example, the deformable element 22 could be formed by jacks moving a membrane covered by the trim layer 20 or the like. The receiving surface 18 could be formed directly by the outer surface of the deformable element 22 in the case of a support device 14 attached on the trim layer of the floor 2.

The support device 14 is in particular deformable between two extreme positions respectively corresponding to the upright position FIG. 1) and the lying position (FIG. 2) of the seat 4.

In the upright position shown in FIG. 1, the deformable element 22 is for example deformed such that the outer surface of the trim layer 20 extends in at least two different planes. A first plane 24 for example forms an angle $\delta$ with the floor 2 close to the angle $\alpha$ formed between the seat bottom 6 and the longitudinal direction X. A second plane 26 for example forms a larger angle very different from the angle $\delta$ with the floor 2. The first plane 24 extends from the floor 2 and close to the latter, while the second plane 26 extends from the first plane 24 toward the dashboard 10 such that the second plane 26 extends higher than the first plane 24. The receiving surface 18 is formed in the first plane 24 on which the feet 16 of the occupant of the seat 4 naturally rest when the seat is in the upright position. According to one embodiment, the angle $\delta$ is for example such that the first plane 24 extends parallel to the seat bottom 6 of the seat 4 in the upright position.

Figure 2:
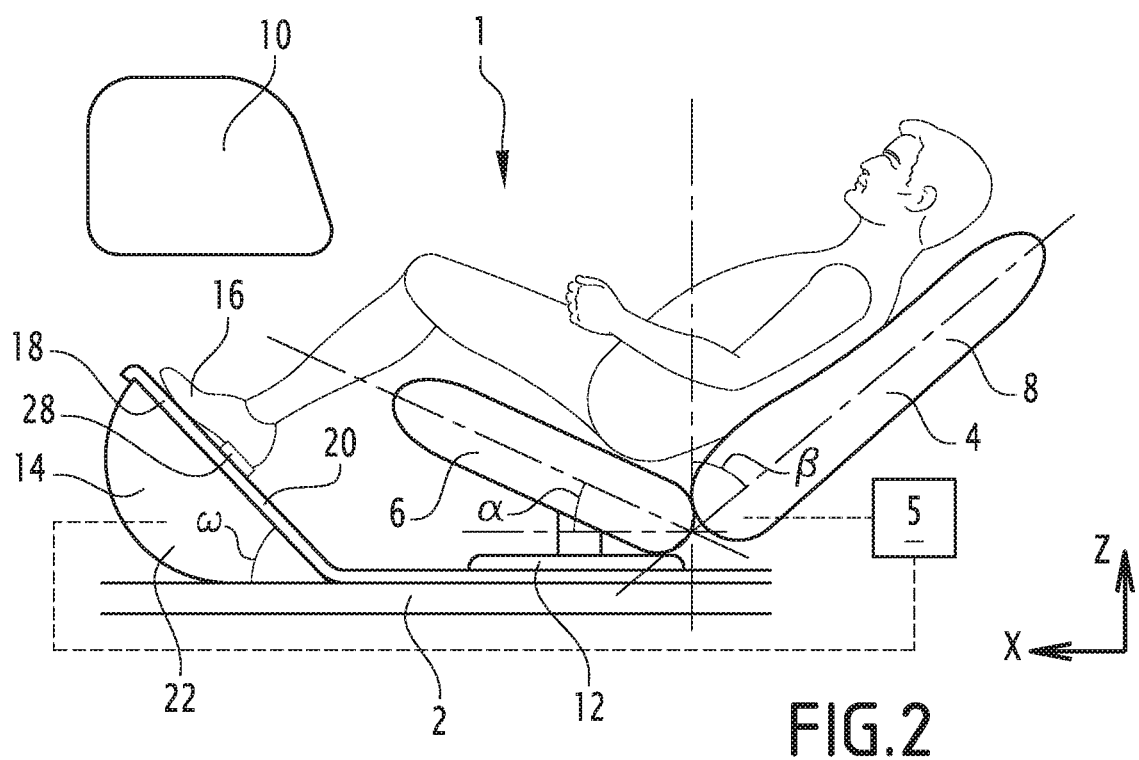
FIG. 2 is a schematic side illustration of the vehicle of FIG. 1, in which the seat is placed in an idle position.

In the lying position shown in FIG. 2, the deformable element 22 is for example deformed such that the outer surface of the trim layer extends in a single plane 28, i.e., relative to FIG. 1, the first and second planes 24 and 26 are combined. The plane 28 forms an angle $\omega$ with the floor 2, which is for example greater than or equal to the angle δ between the first plane 24 and the floor 2. The receiving surface 18 is then formed over all or part of the plane 28. In particular, in the lying position, the feet 16 of the occupant of the seat 4 may naturally bear on the upper part of the plane 28, near the dashboard, as shown in FIG. 2. Thus, the distance between the floor 2 and the receiving surface 18 in the upright position is smaller than the distance between the floor 2 and the receiving surface 18 in the lying position. According to one embodiment, the angle w is for example such that the plane 28 extends substantially parallel to the seat bottom 6 of the seat 4 in the lying position.

Between the two positions described above, the deformable element 22 can adopt a multitude of positions arranged to adapt to the position and the orientation of the seat bottom 6 and/or the seat back 8. Among these positions, the adjacent positions are said to be continuous, i.e., one goes from one position to the other through a continuous deformation of the deformable element 22. Thus, the positions are not "notched", i.e., the deformation between two adjacent positions is minimal, such that these positions are not spaced apart from one another.

The deformation of the deformable element 22 is for example controlled by the control device 5 such that a change in the position of the seat 2 causes a corresponding deformation of the deformable element 22. Thus, the adjustment of the position of the receiving surface 18 is done in a synchronized manner with the adjustment of the position of the seat 2 by the user. In other words, the deformation of the support device 14 is coupled with the movement of the seat 4 such that the movement of the seat 4 causes a continuous and coordinated deformation of the support device 14. Thus, a modification of the position and/or the orientation of the seat bottom 6 and/or the seat back 8 causes a corresponding change in the position and/or the orientation of the receiving surface 18, which makes it possible to position the receiving surface 18 naturally beneath the feet 16 of the user based on the morphology and posture adopted by the user in the seat 4. In this case, the control device 5 for example comprises a single interface with which the user interacts to adjust the position of the seat 4, while the position of the receiving surface 18 is modified automatically as a function of this adjustment.

Thus, as an example, a change in the orientation of the seat bottom 6 causes a change in the orientation of the receiving surface 18 such that the receiving surface 18 remains substantially parallel to the axis of the seat bottom 6. According to another example, when the seat 4 is translated, the support surface 18 moves so as to stay at a substantially constant distance from the seat 4.

It may further be provided to adjust the position of the receiving surface 18 independently of that of the seat. Indeed, this adjustment can be useful to adapt the position of the receiving surface 18 to the morphology of different users, while the position of the seat is not necessarily modified. To that end, the control device 5 is for example arranged to operate in a synchronized mode in which a change of the position of the seat 2 causes a change of the position of the receiving surface 18 and in a desynchronized mode in which the position of the receiving surface 18 can be modified independently of that of the seat 2.

The vehicle described above makes it possible to adapt the position of the seat and that of the support device for increased postural comfort for a large segment of the population, for example from the fifth percentile to the ninety-fifth percentile of the population.

The invention claimed is:

1. A vehicle, comprising:
    a vehicle body comprising a floor, partially defining the inside of the passenger compartment of the vehicle,
    a seat extending over the floor in the passenger compartment of the vehicle, said seat being movable relative to the body of the vehicle,
    a foot support device for the occupant of the seat extending over the floor near the seat and defining a surface for receiving the feet, said support device being deformable relative to the body of the vehicle so as to modify at least the orientation of the receiving surface,
    wherein the deformation of the support device is coupled with the movement of the seat such that the movement of the seat causes a coordinated deformation of the support device.

2. The vehicle according to claim 1, wherein the deformation of the support device is coupled with the movement of the seat such that the movement of the seat causes a continuous deformation of the support device.

3. The vehicle according to claim 1, wherein the seat comprises a seat bottom and a seat back, the orientation of the seat bottom and/or the seat back being able to be modified during the movement of the seat, the support device being deformable so as to adapt the orientation of the receiving surface to the orientation of the seat bottom and/or the seat back.

4. The vehicle according to claim 3, wherein the receiving surface remains substantially parallel to the seat bottom during the movement of the seat.

5. The vehicle according to claim 1, wherein the seat can be translated in a longitudinal direction of the passenger compartment of the vehicle, the support device being deformable so as to adapt the position of the receiving surface to the position of the seat in the longitudinal direction.

6. The vehicle according to claim 1, wherein the receiving surface is inclined relative to the floor, the deformation of the support device being arranged to modify the incline angle of the receiving surface relative to the floor.

7. The vehicle according to claim 1, wherein the support device comprises at least one deformable element and a trim layer covering said deformable element, the receiving surface being formed by at least part of the outer surface of said trim layer.

8. The vehicle according to claim 7, wherein the support device is deformable between an upright position and a lying position, the outer surface of the trim layer extending in at least two planes and the receiving surface extending in one of said planes in the upright position and the outer surface of the trim layer extending substantially in a single plane in the lying position.

9. The vehicle according to claim 8, wherein the distance between the floor and the receiving surface in the upright position is smaller than the distance between the floor and the receiving surface in the lying position.

10. The vehicle according to claim 7, wherein the deformable element is an inflatable element.

11. The vehicle according to claim 1, wherein the movement of the seat and the deformation of the foot support device are commanded by a control device controlled by a user such that a modification of the movement of the seat causes a deformation of the support device.

* * * * *